United States Patent [19]

Ono et al.

[11] 3,736,851

[45] June 5, 1973

[54] AUTOMATIC EXPOSURE TIME CONTROL CIRCUIT FOR ELECTRONIC SHUTTERS

[75] Inventors: Sheigo Ono, Koboku-ku, Yokohama; Ichiro Hamaguchi, Shinagawa, Tokyo; Kenji Toyoda, Shinyuku-ku, Tokyo, all of Japan

[73] Assignee: Nippon Kogaku K.K., Tokyo, Japan

[22] Filed: Sept. 29, 1971

[21] Appl. No.: 184,780

[30] Foreign Application Priority Data

Sept. 30, 1970 Japan ................................45/85418

[52] U.S. Cl. ............................................95/10 CT

[51] Int. Cl. ............................................G03b 7/08

[58] Field of Search ....................95/10 CT; 356/223

[56] References Cited

UNITED STATES PATENTS 3,641,890 2/1972 Ono........................................95/10

3,648,053 3/1972 Sato....................................95/10 X

FOREIGN PATENTS OR APPLICATIONS 4,419,747 9/1966 Japan......................................95/10

*Primary Examiner*—Samuel S. Matthews

*Assistant Examiner*—Michael L. Gellner

*Attorney*—Joseph M. Fitzpatrick, John Thomas Cella, Charles B. Cannon et al.

[57] ABSTRACT

A circuit for automatically controlling the open time of an electronic shutter in accordance with the light of a scene being photographed having a charging circuit which includes a capacitor and a silicon diode connected in series and which is charged responsive to the opening of the shutter, a silicon photodiode for providing a terminal voltage logarithmically proportional to the intensity of the light, and an electrical circuit for combining the terminal voltages of the silicon diode and the silicon photodiode and closing the shutter when the combined terminal voltage reach a predetermined value.

13 Claims, 1 Drawing Figure

AUTOMATIC EXPOSURE TIME CONTROL CIRCUIT FOR ELECTRONIC SHUTTERS

BACKGROUND OF THE INVENTION

1. Field of the Invention

This invention relates to an exposure time control circuit, and more particularly to an automatic exposure time control circuit for operating an electronic shutter in a photographic camera or the like.

2. Description of the Prior Art

It is known to control the exposure time of a camera in response to an electrical output of a photoelectric element. Cadmium sulfide (CdS) cells are widely used as such photoelectric elements. However, CdS cells have a relatively slow response when the brightness of the light is low, their electric output is influenced by hysterisis, and their spectral sensitivity is predominantly in the infrared region.

Silicon photodiodes (those modified for use in exposure meters or cameras are called in the trade "silicon blue cells") are employed in many applications to avoid the above-mentioned drawbacks of CdS cells. Specifically, the disadvantages of a CdS cell can be overcome by the use of silicon photodiode together with a suitable optical filter. However, this silicon photodiode-optical filter arrangement is also technically disadvantageous since the electric output of a photodiode is very small, and depends greatly upon temperature.

SUMMARY OF THE INVENTION

The present invention relates to a circuit which uses the photocurrent of a silicon photodiode for automatically controlling the exposure or open time of a shutter and it is an object of the present invention to provide a circuit arrangement which is not subject to above-mentioned defects previously attendant in the use of a silicon photodiode.

In accordance with one aspect of the present invention, a circuit for automatically controlling the open time of a shutter includes a charging circuit having a first diode and a capacitor in series connection with a power source and interconnected to the shutter so that the charging thereof starts with the opening of the shutter. The terminal voltage across the first diode varies as a function of time beginning with the opening of the shutter and this terminal voltage is compared with the open circuit voltage of a silicon photodiode responsive to the light which is to control the open time of the shutter. When the difference between terminal voltage of the first diode and of the photodiode reaches a predetermined level, a magnet, which operates to hold the shutter and control its open time, is deenergized to permit the shutter to close. This arrangement substantially reduces the effect of temperature on the electric output of the silicon photodiode.

According to another aspect of the present invention, the silicon photodiode is coupled to the gate electrode of a field effect transistor whose input resistance can be regarded as substantially infinite, so that the field effect transistor may be controlled by the open-circuit voltage of the silicon photodiode. This arrangement avoids substantially the problem of extremly low output current of the silicon photodiode found in many prior art silicon photodiode circuits.

BRIEF EXPLANATION OF THE DRAWING

The single FIGURE of the drawing shows a schematic circuit diagram of one preferred embodiment of the present invention.

DESCRIPTION OF THE PREFERRED EMBODIMENTS

Figure 1:
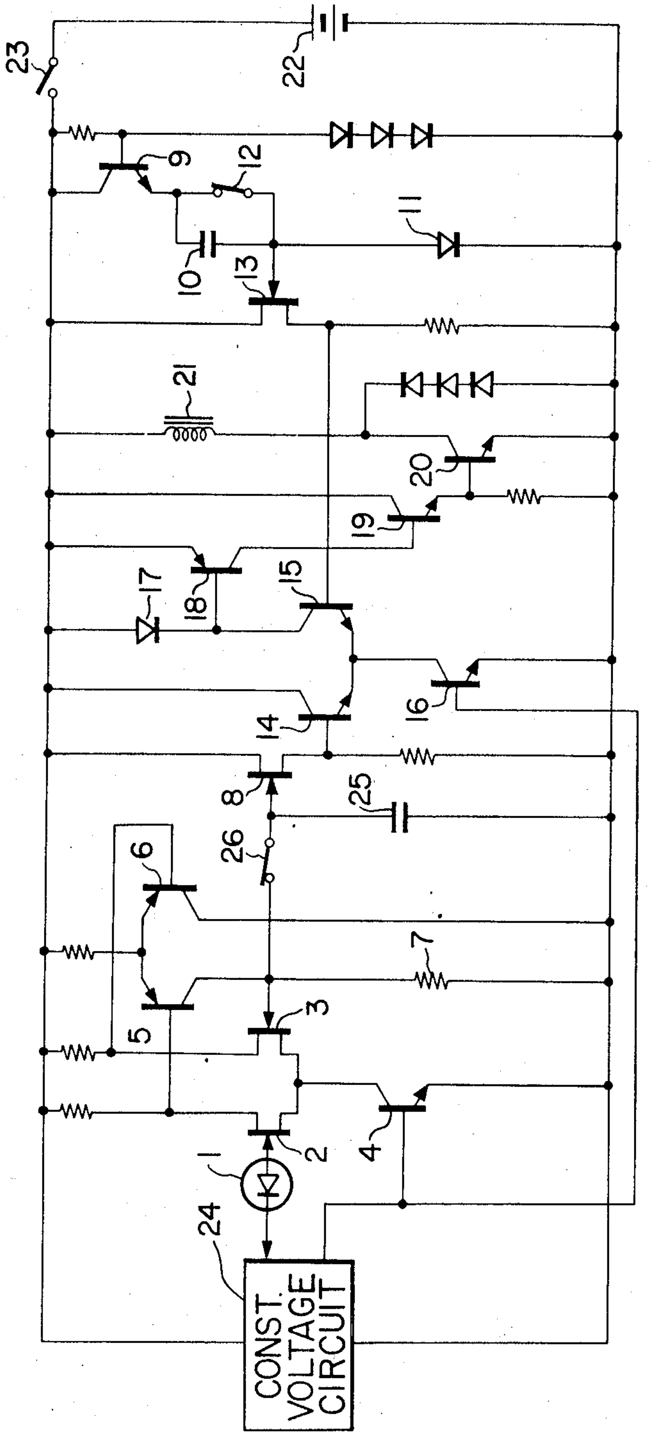

Before explaining the preferred embodiment shown in the drawing, the theoretical background of the invention will be described.

The terminal voltage $V_{D1}$ of a silicon photodiode is given by the following equation:

$$V_{D1} = (kT/q) \ 1n \ (I_1/I_{01}) = h \ 1n \ (I_1/I_{01}) \qquad (1),$$

where $K$: Boltzman's constant:
$T$: Absolute temperature,
$q$: Charge of an electron,
$I_1$: Photocurrent,
$I_{01}$: Reverse saturation current of the silicon photodiode, and
$h$ $(kT/q)$: a coefficient proportional to temperature.

It will be seen from Equation (1) that the open-circuit voltage of a photodiode depends considerably upon the absolute temperature $T$ and the reverse saturation current Io, the latter, in turn, being greatly influenced by the absolute temperature $T$. Therefore, one of the important problems in the use of such device as a photoelectric element is the compensation or minimization of temperature performance of its reverse saturation current I*o*.

Next, for the reason hereinafter discussed, the change in the terminal voltage of a diode in a charging circuit having a capacitor in series therewith, will be considered. The relationship between the change in the voltage across the capacitor and its charging current is:

$$I_2 = C(dVc/dt) \qquad (2),$$

where $I_2$: charging current,
$C$: capacitance of the capacitor,
$Vc$: voltage across the capacitor, and
$t$: charging time.

The relation between the terminal voltage of a diode series connected to this capacitor, and the current flowing through the diode is:

$$V_{D2} = h \ 1n \ (I_2/I_{02}) \qquad (3),$$

where $V_{D2}$: terminal voltage of the diode,
$I_2$: current flowing through the diode and which is equal to the charging current of the capacitor, and
$I_{02}$: reverse saturation current of the photodiode.

From equations (2) and (3) it follows:

$$V = V_c + h \ ln \left( \frac{C\frac{dVc}{dt}}{I_{o2}} \right) \qquad (4)$$

where $V$: voltage of the power source of the charging circuit.

Equation (4) must be solved with respect to $Vc$, but for simplicity it is first solved with respect to $t$ and then to $Vc$. Rearranging equation (4) it will be seen that:

$$dt = (C/I_{02}) \exp [(Vc - V)/h]\, dVc \quad (5).$$

Therefore, $$t = (C/I_{02}) \exp (-V/h) \int \exp (Vc/h)\, dVc = (Ch/I_{02}) \exp [(Vc - V)/h] + A \quad (6).$$

Since $Vc = 0$ when $t = 0$, it follows:

$$A = -(Ch/I_{02}) \exp (-V/h) \quad (7).$$

Hence, $$t = (Ch/I_{02}) \exp (-V/h) \{\exp (Vc/h) - 1\} \doteqdot (Ch/I_{02}) \exp (-V/h) \exp (Vc/h) \quad (8).$$

Therefore, the voltage across the capacitor in series with the diode changes with time as shown by the following equation:

$$Vc = h \ln (I_{02} \cdot t/Ch) + V \quad (9).$$

Therefore, the change of the terminal voltage of the diode is given by:

$$V_{D2} = V - Vc = -h \ln (I_{02} \cdot t/Ch) \quad (10).$$

From equation (10), it will be seen that the terminal voltage $V_{D2}$ is independent of the voltage $V$ of the power source.

Assuming the shutter is closed when the open-circuit voltage of the photodiode becomes equal to the terminal voltage of the diode in series with the capacitor C, the exposure time $t$ may be obtained by equating equations (1) and (10) as follows:

$$h \ln (I_1/I_{01}) = h \ln (I_{02} \cdot t/Ch) \quad (11).$$

Hence, $$I_1 t = C\, h\, (I_{01}/I_{02}) = C\, (KT/q)\, (I_{01}/I_{02}) \quad (12).$$

When a silicon diode is employed as the diode in series with the capacitor $C$ in the charging circuit, the ratio $I_{01}/I_{02}$ is a constant which is independent of temperature. Furthermore, when a silicon photodiode is also employed as the diode in series with the capacitor $C$ and, if no radiation is incident upon this silicon photodiode, the ratio $I_{01}/I_{02}$ becomes unity, i.e. $I_{01}/I_{02} = 1$. In either case, the term to the right of the equal sign in equation (12) is dependent only upon the absolute temperature T and is completely independent upon the reverse saturation current $I_{01}$, which, in turn, is greatly dependent upon the absolute temperature $T$. In addition, this right hand term is also independent of the voltage of the power source of the charging circuit.

Since as shown by equation (12) the open time $t$ or the exposure time $t$ can be made only dependent upon the absolute temperature T, the errors in the response of the silicon photodiode used in a camera having a service temperature within the temperature range between −20°C and +55°C with a reference temperature selected as 10°C, is computed as follows:

at −20°C (273 − 20)/(273 + 10) = 0.89 (= −11%), and at 55°C (273 + 55)/(273 + 10) = 1.16 (= +16%).

These errors are less than ± ¼ EV. Since the photocurrent $I_1$ of the silicon photodiode is proportional to the intensity of light of an object being photographed, the term $I_1 t$ of equation (12) is a quantity which is proportional to the product of the brightness of the object and an exposure time. In order to automatically control the exposure or open time of a shutter, the quantity $I_1 t$ should always be constant. It will be seen from equation (12) that this condition will be satisfied with an error of ¼ EV when the service temperature is between −20°C and +55°C.

Figure 2:
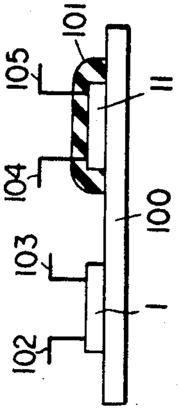

In the drawings:

FIG. 1 is a diagram showing an embodiment of an automatic exposure time control circuit according to my invention; and FIG. 2 is a side elevation, partially in section, showing the light intercepting silicon photodiode and the covered silicon photodiode formed on the same substrate.

The automatic exposure time control circuit shown in the drawings embodies the principles described hereinabove. As shown therein, a voltage logarithmically proportional to the brightness of light falling thereon is produced by the silicon diode 1 and is applied to a first input terminal (the gate electrode of the field effect transistor 2) of a first differential amplifier consisting of the field effect transistor 2 and 3 and of a transistor 4. The output from this first differential amplifier is then applied to an input terminal of a second differential amplifier consisting of the transistors 5 and 6. The collector of the transistor 5 is coupled to a second input terminal (gate electrode of the field effect transistor 3) of the first differential amplifier. As the input at the first input terminal of the first differential amplifier increases, the drain voltage of the field effect transistor 2, and hence the base voltage of the transistor 5, decrease; and the drain voltage of the field effect transistor 3, and hence the base voltage of the transistor 6, increase causing the collector current of the transistor 5 to increase. As a consequence, the voltage drop across a resistor 7 connected to the gate electrode of the field effect transistor 3, also increases, so that the input to the second input terminal of the first differential amplifier also increases. Thus, the voltage level of the input applied to the second input terminal of the first differential amplifier always corresponds to the level of the input to the first input terminal of the first differential amplifier. The voltage level at the input applied to the second terminal of the first differential amplifier is applied to the gate of the field effect transistor 8.

A charging circuit is provided consisting of a transistor 9, which limits the charging voltage, and a series circuit of a capacitor 10 and a diode 11 connected to the emitter of the transistor 9. The capacitor 10 is shunted by a normally closed switch 12 which is opened in response to the opening of the shutter. When the switch 12 is opened, the charging of the capacitor 10 begins, and the voltage across the diode 11 which drops in logarithmic proportion to time is applied to the gate electrode of the field effect transistor 13.

The field effect transistors 8 and 13 are connected in source-follower configuration and their outputs are coupled respectively to the first input (base of transistor 14) and the second input (base of transistor 15) of a third differential amplifier consisting of transistors 14, 15 and 16. The output of the third differential amplifier appears as a voltage drop across a diode 17, and is applied to a transistor 18 which constitutes, together with transistors 19 and 20, a switching circuit. The output of this switching circuit is, in turn, applied to a coil 21 which energizes a magnet operable to hold and prevent the closure of the shutter blade.

The power is applied to the described circuit by a battery 22 through a selectively operable switch 23.

In operation, upon the release of the shutter, the switch 23 is closed and a voltage, the magnitude of which is logarithmic proportion to the brightness of a subject being photographed, is applied to the first input terminal (base of transistor 14) of the third difference amplifier, as described above. Since the capacitor 10 is shunted by the switch 12 prior to shutter operation, upon the opening of the shutter, the terminal voltage of diode 11 causes a greater voltage than that applied to the first input terminal, to be established at the second input terminal (base of transistor 15) of the third differential amplifier. As a result, all of the transistors 18, 19 and 20 are made conductive, causing the magnet 21 to hold the shutter and prevent it from closing. When the shutter is initially opened, the switch 12 is also opened so that the capacitor 10 starts to charge and, as a result, the voltage across the diode 11 drops logarithmically in proportion to the charging time. This droppage in voltage causes the voltage at the second input terminal of the third difference amplifier to decreased. The decrease of this voltage also causes the voltage drop across the diode 17 to decrease correspondingly. When the voltage drop across the diode 17 reaches a predetermined level, the transistor 18 is turned off or rendered nonconductive, rendering transistors 19 and 20 also nonconductive, and thereby deenergizing the magnet to release and close the shutter.

The automatic exposure time control circuit of the type described above may be modified depending upon use. First, as described hereinabove, better results can be attained by employing a covered silicon photodiode as the diode 11. In addition, if this latter silicon photodiode is formed on the same substrate or base as the light intercepting silicon photodiode 1, the temperature dependency of the circuit may be further corrected. FIG. 2 shows the light intercepting silicon photodiode 1, having a cathode terminal 102 connected to the constant voltage circuit 24 and an anode terminal 103 connected to the gate of the field effect transistor 2, and the covered silicon photodiode 11 having an opaque covering 101 so as to shut off ambient light and having a cathode terminal 104 connected to the minus (−) terminal of the battery 22 and an anode terminal 105 connected to the capacitor 10. The light intercepting silicon photodiode 1 and the covered photodiode 11 are formed on a common substrate 100.

As a second modification, a constant voltage circuit 24, which may compensate for any drift of the voltage of the power source 22, as well as provide a voltage which is dependent upon the temperature with the proportionality constant *h*, whose magnitude changes stepwise with a constant level difference in response to the speed of film used in the camera or the aperture stop of the camera lens, may be used. These compensating voltages can be applied, in addition to the terminal voltage of the silicon photodiode 1, to the first input terminal (gate of field effect transistor 2) of the first difference amplifier. With this modification, the exposure time may be also controlled as a function of the film speed or the aperture opening of the camera lens.

As a third modification, a memory capacitor 25 may be coupled through a switch 26 in parallel to the gate electrode of the field effect transistor 3 so that the capacitor 25 will charge with the same voltage as that across the resistor 7. This arrangement may be required, for example, in a single-lens reflex camera of the type in which the silicon photodiode 1 is located so as to intercept the light which passes through a taking lens. As more fully discussed in co-pending and commonly assigned U. S. Pat. application Ser. No. 157,943, filed June 29, 1971, in this type of camera, a mirror is removed from the optical path of the meter upon the depression of the shutter release button, so that the light passed through the camera lens would not reach the silicon photodiode 1 after such depression. Therefore, a memory capacitor 25 is provided for memorizing the voltage representing the brightness of the object being photographed immediately before the mirror is retracted out of the optical path. It will be seen therefore, that the switch 26 should be a normally closed switch arranged to be opened after actuation of the mirror retracting means, but before the mirror begins to retract. Since the input resistances or impedances of the field effect transistors 3 and 8 are very high, the voltage charged across the capacitor 25 may be held for a long time so it can serve to control a relatively long exposure time. Furthermore, the paired field effect transistors 8 and 13 have the distinct advantage that any temperature dependence in each may be cancelled by the other.

As a fourth modification, when it is not required to control a relatively long exposure time, the voltages across the resistor 7 and the diode 11 may be directly applied to the first and second input terminals of the third difference amplifier by bypassing the field effect transistors 8 and 13. However, this case the input resistance of the third difference amplifier should be increased, for example, by employing a plurality of transistors in Darlington configuration, instead of the transistors 14 and 15.

According, it will be appreciated from the above, that by the present invention the temperature dependence of a photodiode used to measure the intensity of light or brightness of a subject, is compensated to provide precise control of an exposure time and the photodiode is connected in a circuit arranged so that any voltage variation of the power source does not significantly affect the photodiode's performance.

What is claimed is:

1. A circuit for automatically controlling the open time of an electronic shutter in accordance with the light of a scene being photographed comprising: charging circuit means including a capacitor and a silicon diode in series connection, means responsive to the opening of said shutter for initiating the charging of said capacitor in said charging circuit, a silicon photodiode providing a terminal voltage logarithmically proportional to the indensity of said light, combining means responsive to the terminal voltage of said silicon diode and the terminal voltage of said silicon photodiode, and means responsive to said combining means for closing said shutter when the combined terminal voltages of said silicon diode and of said silicon photodiode reach a predetermined value.

2. A circuit as in claim 1, wherein said silicon diode is a silicon photodiode covered from ambient light.

3. A circuit as in claim 1, wherein said silicon diode is formed on a substrate common to said silicon photodiode.

4. A circuit as in claim 1, wherein said means responsive to the opening of said shutter for initiating the charging of said capacitor, includes a switch connected across said capacitor for switching same in and out of operation in response to the opening and closing of said shutter.

5. A circuit as in claim 1, wherein said silicon photodiode is coupled to said combining means through a field effect transistor having a gate electrode, a drain electrode and a source electrode, said silicon photodiode being connected across said gate electrode and one of said drain and source electrodes.

6. A circuit as in claim 5, wherein said silicon diode is coupled to said combining means through a second field effect transistor having a gate electrode, a drain electrode and a source electrode, said silicon diode being connected across said gate electrode and one of said drain and source electrodes of said second field effect transistor.

7. A circuit as in claim 1, wherein said combining means is a comparator for comparing the difference between the terminal voltage of said silicon diode and the terminal voltage of said silicon photodiode and wherein said means responsive to said combining means closes said shutter when said difference reaches a predetermined value.

8. A circuit as in claim 1, wherein said means responsive to said combining means for closing said shutter includes a solenoid coil for holding said shutter, and switch means for deenergizing said coil when the combined terminal voltages of said silicon photodiode and silicon diode reach said predetermined value.

9. In a camera having an electronic shutter system including a shutter, opening means for opening said shutter and control means for controlling the time of closure of said shutter, an automatic exposure control circuit comprising charging circuit means including a capacitor and a silicon diode in series connection with a power source, means coupled to said shutter opening means for initiating the charging of said capacitor circuit upon the opening of said shutter, a silicon photodiode providing a terminal voltage logarithmically proportional to the light of the scene being photographed by said camera, combining means responsive to the terminal voltage of said silicon diode and the terminal voltage of said silicon photodiode for providing an actuating output, and means responsive to a predetermined amplitude of said actuating output for selectively operating said control means for controlling the time of closure of said shutter.

10. The invention according to claim 9, further comprising memory means coupled to said silicon photodiode for memorizing the value of brightness of the light of the scene being photographed by said camera.

11. The invention according to claim 9, further comprising a voltage source in series connection with said silicon photodiode.

12. A circuit according to claim 9, wherein said silicon diode is a silicon photodiode free from ambient light.

13. A circuit according to claim 9, wherein said silicon diode is formed on a substrate common to said silicon photodiode.

* * * * *